United States Patent [19]

Munn et al.

[11] Patent Number: 4,979,830
[45] Date of Patent: Dec. 25, 1990

[54] METHOD FOR FLUIDIZED BED CIRCULATION CONTROL

[75] Inventors: Robin W. Munn, Sayre; Dale E. Benjamin, Athens, both of Pa.; A. Gary Sigai, Lexington; Silvia E. Lichtensteiger, Acton, both of Mass.

[73] Assignee: GTE Products Corporation/GTE Laboratories, Inc., Stamford, Conn.

[21] Appl. No.: 416,217

[22] Filed: Oct. 2, 1989

[51] Int. Cl.$^5$ .................. B01F 13/02; B01F 11/00
[52] U.S. Cl. .................................. 366/102; 366/107; 366/118; 366/145; 366/167; 427/213
[58] Field of Search ............... 366/102, 107, 117–120, 366/276, 278, 289, 167, 332, 147, 108, 130, 111–114, 144, 145; 427/213, 215; 241/172

[56] References Cited

U.S. PATENT DOCUMENTS

| | | | |
|---|---|---|---|
| 2,281,094 | 4/1942 | Chambers | 366/332 |
| 2,376,221 | 5/1945 | Baker | 366/289 |
| 2,417,372 | 3/1947 | Morris | 366/332 |
| 2,615,692 | 10/1952 | Muller | 366/332 |
| 2,681,798 | 6/1954 | Muller | 366/118 |
| 4,401,268 | 8/1983 | Pomponi, Jr. | 366/260 |
| 4,511,254 | 4/1985 | North et al. | 366/118 |
| 4,585,673 | 4/1986 | Sigai | 427/213 |
| 4,732,487 | 3/1988 | Pollard | 366/112 |

FOREIGN PATENT DOCUMENTS 1414880  6/1974  United Kingdom ............... 366/118

Primary Examiner—Timothy F. Simone
Attorney, Agent, or Firm—Robert E. Walter

[57] ABSTRACT

Disclosed is a method for adjustably controlling the rate of circulation and temperature gradient in a fluidized bed.

3 Claims, 1 Drawing Sheet

U.S. Patent
Dec. 25, 1990
4,979,830
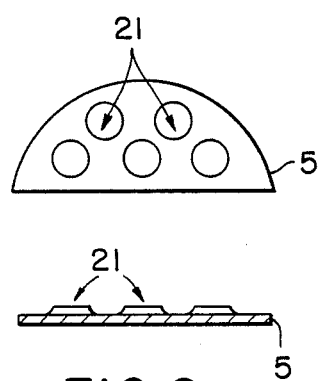
FIG. 3
FIG. 2
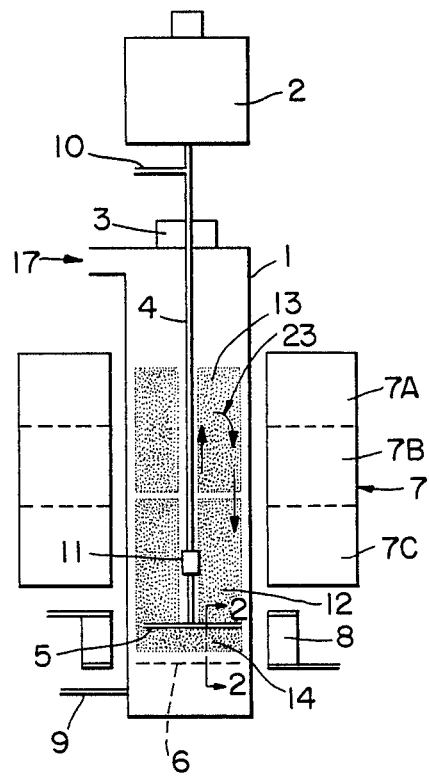
FIG. 1

METHOD FOR FLUIDIZED BED CIRCULATION CONTROL

BACKGROUND OF THE INVENTION

This invention relates fluidized beds and temperature control therein. For many chemical reactions which can be carried out in a fluidized bed, there is a dependence on the reaction rate as well as the time at a specific temperature. In fact, many of these reaction rates vary exponentially with temperature. Therefore, it is desirable to be able to control temperature, powder motions and temperature profiles within the fluidized bed. In the case of production scale equipment, it is difficult to accurately control these parameters to within accepted tolerances, since the powder characteristics can change throughout the course of the reaction. This invention describes a method for controlling powder motion, establishing a temperature profile, as required, and controlling the magnitude of the temperature gradient. The present invention is an improvement on the invention described in mentioned below U.S. patent and more specifically relates to the fluidized bed.

SUMMARY OF THE INVENTION

The vibratory agitator of U.S. Pat. No. 4,585,673 to Sigai breaks up channels during the fluidization process and helps impose some motion to the powder in the bed. The magnitude of the temperature gradient using the apparatus cited in the above patent is determined by the specific type of powder used, the particle size, distribution, and morphology, as well as the concentration of the fluidizing aid added.

According to the present invention, particles are fluidized in a fluidized bed of the type confined within an elongated vessel having a vertically oriented central axis and an interior side wall. Means for imparting motion to said bed comprises an agitator body and means for vibrating the agitator body back and forthe along the direction of the central axis. The agitator body is disposed in a direction perpendicular to the central axis and includes a solid peripheral portion and an open interior portion. The agitator body is vibrated to cause said particles to travel upwardly along the axial central portion of the bed and downwardly along an interior side wall of the vessel in a circulating motion at a rate of travel which may be altered by changing the vibrating motion of the agitator body.

According to another aspect of the present invention, the rate of circulating motion of the bed is altered to alter the temperature gradient from a top portion of the bed to a bottom portion of the bed. An increase in the rate of circulation decreases the temperature gradient while a decrease in the rate of circulation will increase the temperature gradient. The temperature gradient is typically created by a source of heat which may be either internal or external to the bed. The adjustable vibrator means is actuated for establishing and controlling a predetermined temperature gradient in the bed.

The primary circulatory motion of particles in gas fluidized bed is preferably up the center of the bed and down along the walls of the bed. This circulation pattern is often very weak or non-existent when the particles are too fine and/or cohesive to be effectively fluidized. The cohesiveness of such powders can often be reduced by blending small quantities of a lubricant material, or fluidizing aid, with the material to be fluidized. However, usage of these fluidizing aids may be limited since the material may in fact be an impurity to the host powder. Mechanical aids such as rotary impellers to enhance circulation in poorly fluidized beds have also been proposed. Unfortunately, these types of agitators can significantly increase particle attrition within the bed. Also, the impeller blades will inevitably erode if the bed material is the least bit abrasive. This will require regular replacement of the blades as well as potentially add unwanted impurities to the bed.

According to the improvement of the present invention, in fluidized bed provided with an external cooling and heating means, the vibrating motion of the vibratory body is adjustably controlled to circulate the phosphor particles so as to maintain a predetermined temperature gradient from the bottom to the top portion of the fluidized bed. The vibrating means is adapted to control the amplitude of the agitator body for obtaining a predetermined temperature gradient in the fluidized bed.

BRIEF DESCRIPTION OF THE DRAWING

FIG. 1 is a schematic representation of an apparatus suitable for use in the method of the present invention.

FIG. 2 is a partial side view of the agitator along section 2—2.

FIG. 3 is a top elevational view of the partial view of FIG. 2.

For a better understanding of the present invention, together with other and further objects, advantages and capabilities thereof, reference is made to the following disclosure and appended claims in connection with the above described drawing.

DETAILED DESCRIPTION

The fluidizing particles of a powder are confined within an elongated vessel having a vertically oriented central axis and an interior side wall. Means are provided for imparting a circulating motion to said bed wherein said particles travel upwardly along the axial central portion of the bed and downwardly along an interior side wall of the vessel. The means for imparting a circulating motion comprises an agitator body and means for vibrating the agitator body back and forth along the central axis. The agitator body is disposed in a direction perpendicular to the central axis and has a solid peripheral portion and an open interior portion intermediate to the periphery and said central axis for permitting the upward flow of particles through said open interior portion and upwardly in the direction of the central axis.

For a better understanding of the apparatus, please refer to FIG. 1. The means for imparting a circulating motion to the fluidized bed 12 includes a vibrator 2 and an agitator 5 to stimulate and control the motion of cohesive particles in a fluidized bed. The vibration means or vibrator 2 is preferably a VIBRO-MIXER. The VIBRO-MIXER is a reciprocating agitator marketed by Chemap, Inc., which vibrates in the vertical plane at a frequency of 120/sec with a variable amplitude from 0 to 3 mm. The unit is intended for use in liquid mixing applications but is used in the present invention to stimulate "sluggish" fluid beds.

Referring to the drawing in more detail, the fluidized bed 12 of particles is fluidized by a carrier gas which is introduced at inlet 9. The gas is released uniformly into the bed by the distributor 6. At the top of the fluidized bed vessel 1 is the vibrator 2. The vibrator 2 is suspended by a harness so that the agitator shaft 4 is centered in the fluidized bed 12. The shaft 4 may be solid or, if one desires, hollow to inject a secondary substance on or beneath the surface of the bed. The substance can be introduced into the shaft 4 at shaft inlet 10. The shaft 4 enters the vessel 1 above the vessel exhaust port 17 through a static diaphragm seal 3. At the bottom of the shaft 4 is the agitator body or agitator 5 which is vibrated in the vertical plane by the vibrator 2. The vibration of the agitator 5 agitates the fluidized bed 12 of particles and causes the powder to circulate in a normal pattern 23 up the middle and down the sides of the bed.

The shape of the agitator 5 is important to control the rate of powder circulation within the fluidized bed 12. The agitator 5 should have sufficient open area 21 inside its perimeter to allow the fluidizing gas to entrain powder and sweep up the center of the bed. A preferred shape is a flat or conical disk with randomly spaced holes. However, other designs such as flat or cone-shaped rings may be utilized. The particular disk utilized has fifteen holes. Each hole is formed by a peripheral circular flange which tapers slightly outwardly from a position above the plane of the disk. The agitator 5 should be sized to leave sufficient space between its outside perimeter and inside diameter of the fluidizing vessel to permit the powder to complete its circulation pattern down the sidewalls. This "downcomer" area (as well as the plate interior open area) can be roughly calculated from existing fluidized bed mixing equations. As a general rule of thumb, when the agitator is disk shaped, the outside diameter of the disk 5 should be about ⅞ of the inside diameter of the fluidizing vessel 1.

It should be apparent that multiple agitator 5 can be utilized along the shaft 4 within the fluidized bed 12. A plurality of agitators may be spaced close together in sets of two or more to obtain a finer degree of control at a particular location within the bed. The agitators may be spaced further apart to obtain several regions of control within the fluidized bed 9.

In order to adjust the powder circulation rate, the vibrator 2 is equipped with a variable power supply. This can be used to adjust the vibrational amplitude of the agitator 5, and, thereby, adjust the degree of agitation in the bed. As the degree of agitation increases, the circulation rate increases and vice versa. For very cohesive powders such as those classified by Geldart as type C, it may be beneficial to add a small amount of fluidizing aid. However, the fluidizing aid should only be used sparingly since the vibrator 2 will amplify its effect on the quality of fluidization of the bed.

SPECIFIC EXAMPLE

A fluidized bed reactor was assembled as in FIG. 1 using a 4 in ID by 5 ft tall transparent quartz tube for the vessel 1. The VIBRO-MIXER unit 2 was a Model E-2 which was obtained from CHEMAP, INC., along with the standard gas seal 3. The VIBRO-MIXER was equipped with a rheostat so that the vertical amplitude of the agitator could be adjusted from zero to the maximum 3 mm. For the agitator shaft 4, the VIBRO-MIXER was fitted with a piece of steel tubing long enough so that the agitator 5 was approximately three inches above the porous metal gas distributor plate 6. The agitator 5 was a flat plate 3.6875 inches in diameter with fifteen ¼ in. holes regularly spaced throughout the interior of the disk. The circular holes taper outwardly from a top opening. The quartz tube was surrounded by a split-tube furnace 7 to provide indirect heat to the fluid bed. The furnance contained three zones of heating, each 12-in. long. In this test, only the top two zones were utilized while the bottom zone was turned off. An external water cooling coil 8 was installed at the bottom of the vessel from the distributor plate 6 to about an inch above the agitator disk 5. Nitrogen was used as the fluidizing gas which was introduced through connection 9. Also, oxygen was hooked to the shaft at connection 10 and injected directly into the bed via a porous metal sparger 11. The vessel was filled with eight kilograms of zinc silicate powder 12 whose average particle size was around 10 microns. Since this material was extremely cohesive, four grams of aluminum oxide C (0.05% by weight) were added to the zinc silicate powder to improve its fluidity. Two thermocouples were used to measure the temperature of the fluidized power. The upper thermocouple 13 was located in the area which was heated by the furnace. The lower thermocouple 14 was located in the area below the agitator disk 5 which was cooled by the cooling coil. The thermocouples were purposely located at these positions to determine in a qualitative manner how the VIBRO-MIXER affected the circulation rate of powder.

As a test, the VIBRO-MIXER rheostat was adjusted incrementally from 0 to 100% power. Since the frequency of the alternating current was fixed, adjusting the rheostat altered the amplitude of the vibrator body. It is also possible that the circulation motion of the particles be altered by changing the frequency of the vibration. The amplitude of the vibrator body at full power is estimated to be between 2 to 3 millimeters. This amplitude varies with the load in the fluidized bed. A heavy bed would decrease the amplitude.

At each setting, the fluid bed was allowed to stabilize until the two thermocouples reached constant temperatures. The gas flows, the cooling water rate, and the temperatures of the hot furnace zones were held constant. For this test, 6 liters per minute and 12 liters per minute were used for oxygen and nitrogen, respectively. Cooling water was passed through the coils at the rate of 2 gallons per minute. The water inlet temperature was 18 degrees Centigrade. Also, the furance set point temperatures for the top, middle and bottom zones were 700° C., 675° C., and room temperature (power off), respectively.

The results of the thermocouple measurements are detailed in the following table.

| VIBRO-MIXER % POWER | UPPER THERMOCOUPLE | LOWER THERMOCOUPLE |
|---|---|---|
| 0% | 449° C. | 217° C. |
| 25% | 443° C. | 251° C. |
| 50% | 429° C. | 308° C. |
| 75% | 423° C. | 354° C. |
| 100% | 420° C. | 398° C. |

The data indicates that the VIBRO-MIXER affects the circulation rate of the powder. Improved circulation was also observed during operation of the VIBRO-MIXER. Since the cooling capacity of the bottom coil 8 is fixed by the constant water flow rate, the temperature increase at the lower thermocouple can only be explained by a corresponding increase in the mass flow of powder from the hot zone down past the VIBRO-MIXER disk. Likewise, the temperature decrease at the upper thermocouple is a result of the increased mass flow of cooled powder up through the VIBRO-MIXER disk. Theoretically, if the VIBRO-MIXER could be operated to enable maximum circulation efficiency, the temperatures of the two thermocouples would read exactly the same. This isothermal behavior would be indicative of a perfect, bubbling fluidized bed. It is also noteworthy that the visual quality of fluidization improved as the VIBRO-MIXER power was increased. With the VIBRO-MIXER off, the fluid bed was full of cracks and there was much channeling evident. However, as the power was increased the cracks and channels became less apparent and ultimately disappeared.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for fluidizing particles in a fluidized bed, said bed being of the type confined within an elongated vessel having a vertically oriented central axis and an interior side wall, means for imparting motion to said bed comprising an agitator body and means for vibrating the agitator body back and forth along the direction of the central axis whereby a vibrating motion results, said agitator body being disposed in a direction perpendicular to the central axis and having a solid peripheral portion and an open interior portion intermediate to the solid peripheral portion wherein the improvement comprises adjustably controlling the vibrating motion of said agitator body to cause said particles to travel upwardly along the axial central portion of the bed and downwardly along an interior side wall of said vessel in a circulating motion at a rate of travel and changing said vibrating motion to alter the rate of travel, subjecting said fluidized bed to a heat source, first means for measuring temperature at a top portion of said bed and second means for measuring temperature near a bottom portion of said bed, said first and said second temperature sensing means being operable to determine a temperature gradient, and adjusting the vibrating motion of the agitator body for controlling said temperature gradient.

2. A method in accordance with claim 1 comprising further controlling the temperature gradient in said fluidized bed by the circulatory motion, said further control comprising adjusting the vibration of the agitator body for obtaining a predetermined desired temperature gradient in the fluidized bed.

3. A method in accordance with claim 1 wherein said agitator body comprises a solid disc having a plurality of openings.

* * * * *